Dec. 16, 1930. J. P. RATIGAN Re. 17,904
BEARING FOR PUMP OPERATING MEMBERS
Original Filed May 3, 1926
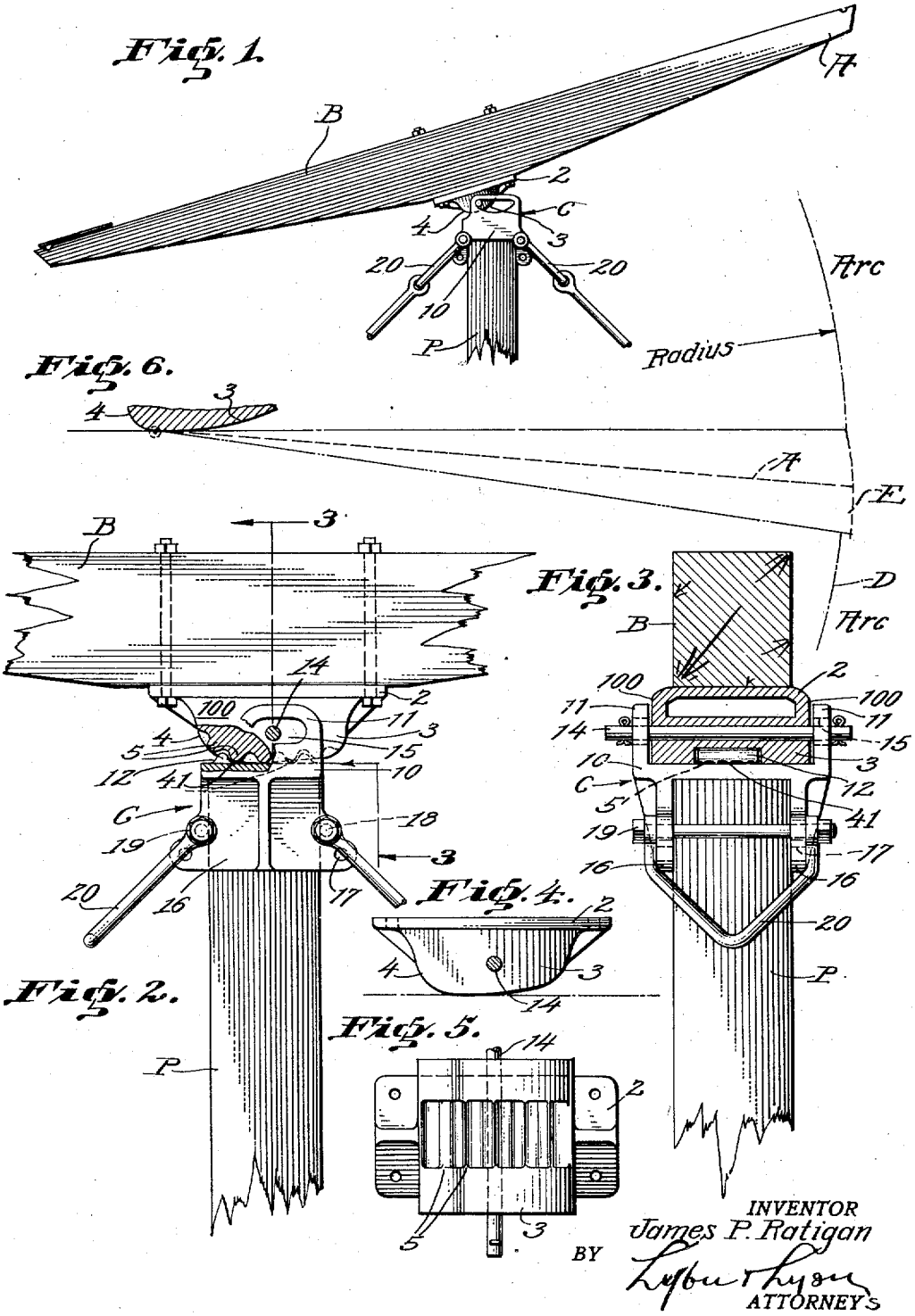
INVENTOR
James P. Ratigan
BY
Lyon & Lyon
ATTORNEYS Reissued Dec. 16, 1930 Re. 17,904

UNITED STATES PATENT OFFICE

JAMES P. RATIGAN, OF LOS ANGELES, CALIFORNIA

BEARING FOR PUMP-OPERATING MEMBERS

Original No. 1,657,178, dated January 24, 1928, Serial No. 106,461, filed May 3, 1926. Application for reissue filed January 18, 1930. Serial No. 421,821.

This invention relates to bearings for the operating members of pumps as, for example, walking beams.

Bearings of this character heretofore employed provided a fixed fulcrum for the operating member and, by my construction of bearing, I obtain a number of distinctive advantages.

In prior bearing constructions for walking beams and like operating members of well pumps, there is considerable lateral strain or bending of the polish rod which of necessity arises from the fact that the beam oscillates on a fixed axis. Furthermore, the relative lengths of the two arms of the lever, represented by the walking beam, does not vary with the prior fixed axis construction of the bearing and, accordingly, the power is not applied to the lever to the greatest advantage, it being held in mind that, because of the necessity of picking up the load at the lower end of the stroke of the polish rod, the application of an increased leverage at this point of the stroke is of advantage.

Accordingly, one of the most important objects of this invention is to minimize the bending of, and consequent strain, to which the polish rod is subjected as the walking beam or other operating member moves to reciprocate said polish rod.

Another very important object is to effect an increase in the power receiving arm and a decrease in the load supporting arm of the walking beam or other pivoted operating member during that portion of its stroke where the load is picked up, or in other words, the lower portion of the stroke of the polish rod and, particularly, at the moment that the polish rod changes from its down to its up stroke, at which time the column of fluid being raised and the weight of the sucker rods are imposed upon the walking beam or other operating member.

Another important object is to provide a construction that will not necessitate the use of a lubricant in the bearing.

Another most important object is freedom from such strains and stresses as are produced in the fixed axis type of bearing when the walking beam or other operating member is deflected laterally or, in other words, when said operating member tends to swing to one side or the other of its normal vertical operating plane.

Another object is to readily secure longitudinal adjustment of the beam without the necessity of even loosening a nut or the changing of any part excepting the position of the beam on its support.

Another object is to provide against accidental displacement of the operating member from its support, or even tilting of said operating member to such an extreme position as would tend to throw the operating member off its support.

Another important object is to facilitate bodily shifting of the walking beam or other pump operating member lengthwise in either direction so as to most effectually determine the setting of the operating member in relation to the polish rod, thus enabling the load end of the operating member to be moved so as to bring the point at which the load is applied to said operating member in different positions with respect to the line of the polish rod.

Another object is the elimination of trunnions, shafts and axles, and the provision of a bearing that can be used for light or heavy loads and that, furthermore, will be suitable, in a single size, for use on different sizes of Samson posts or similar supports.

Another object is to provide a well pump operating member with a mounting means affording progressively changing fulcrum contact with a fixed support, whereby to obtain an effective increase of the length of the power arm and a shortening of the load arm of said operating member when said operating member is on its load-lifting stroke. This invention secures a maximum leverage of the beam on its power arm against a minimum leverage of the load arm at the moment of initiating the load movement.

Further objects and advantages will appear in the subjoined detailed description.

The accompanying drawings illustrate the invention:

Figure 1 is a side elevation of a bearing, for a pump operating member, constructed in accordance with the provisions of this invention, said bearing being shown between a pump operating member and a bearing support.

Figure 2 is an enlarged fragmental side elevation of the parts shown in Fig. 1, partly in section.

Figure 3 is a view of Fig. 2, partly in vertical section on the line indicated by 3—3, Fig. 2.

Figure 4 is a side view of one of the upper bearing members.

Figure 5 is a bottom view of Fig. 4.

Figure 6 is a graph indicating by comparison the difference in a rotating fixed axis bearing and my improved floating fulcrum bearing. Referring to the drawings, an operating member, such as a walking beam which is a lever of the first class, that is, one in which the fulcrum is between the source of power and the load side or resistance, is indicated at B and a support as, for example, a Samson post, at P. My improved bearing is shown in position between the operating member and the support.

The support P includes a saddle C that constitutes the top portion of the support. The mounting or bearing includes the support, as one of the members thereof, and it also includes a rocker which, in this instance, is secured to the operating member B. It is to be understood that the bearing members may be combined, in any suitable manner, with the beam and Samson post.

In this instance, the rocker and saddle are illustrated as heavy castings attached to the beam and post, respectively.

The rocker member 2 has a top face adapted to be bolted, or otherwise suitable secured, against the bottom face of the beam B. The bottom of the rocker has a comparatively wide sole 3 whose face is curved in a true arc, in profile, though the curvature need not be limited to true arc form. Thus the sole is a portion of a cylinder of rotation having a long radius as compared to the radius of the heel part 4 of the rocker. The beam B is preferably in balance when a vertical line passes through the center of the heel 4 and the lowest point of the heel surface, as in the position of the parts illustrated in Fig. 2, when the beam is horizontal.

One of the bearing members is provided with one or more recesses 41 and the other with one or more projections or teeth 5. In this particular instance the recesses 41 constitute the intertooth spaces of a series of teeth 12 and there is also a series of the teeth 5. The teeth 5 and recesses 41 extend transversely of the respective bearing members, and it is to be understood that said projections and recesses may be of any other shape than illustrated.

The sides 100 of the rocker 2 constitute buffer faces that are positioned between upwardly projecting side cheeks 11, of the support P, that flank said side faces 100 but do not snugly bear thereon, thus normally avoiding setting up friction at these faces when the rocker rocks on the upper face of the saddle. This permits of lateral swinging of the beam so that it can aline itself with the polish rod and the pitman. The side cheeks 11, in this instance, project from and are integral with the plate 10. This upper face is formed by a heavy top plate 10 of the saddle and the teeth 12 are formed in said plate 10. The sets of teeth 5, in this instance, are much shorter than the width of the sole and heel of the rocker which latter, in this particular instance, carries and transfers some of the load to the top plate 10. An important function of the teeth 5 and recesses 41, in this instance, is to prevent end shift of the beam relative to the support, since it is desired to insure against slippage between the rocker and the support. Furthermore, the teeth 5 and recesses 41 form a means for facilitating the proper location of the beam on the support.

The side portions of the sole or, in other words, those portions that are outward from the ends of the teeth 5, project downwardly past the ends of said teeth and the spaces therebetween and, accordingly, past the ends of the teeth 12, thus preventing sideplay of the beam. Also the cheeks 11 function to prevent sideplay of the beam.

A means is provided to loosely retain the beam in any of its working positions and, in this instance, said means comprises horizontal projections or studs that are secured to the rocker 2 and project laterally from the faces 100 into elongate pin apertures 15 in the cheeks, said projections or studs, in this instance, being formed by the end portions of a pin 14 that, in this instance, passes entirely through the rocker 2 from side to side thereof. It is obvious that the projections or studs could as readily be formed by separate pins.

The saddle illustrated has strong side flanges 16, to embrace the Samson post, and has differently spaced pairs of bolt-holes 17, 18 to permit of selective application of bolts 19 close up to the sides of different widths of posts.

The pin 14 does not constitute a pivot or fulcrum for the beam, but is simply one form of means to insure against the beam falling off of its support when said beam is detached from the polish rod and from the pitman, not shown, by which it is usually operated.

Suitable guy wire bales 20 may be hung on the bolts 19 to brace the post P.

The invention operates as follows: The beam rests on a transverse line of contact with the saddle and when the beam is, by any means, tilted, this line of contact shifts along the plate 10. When the pump end of the beam is moving down, this line of contact shifts toward said pump end and when said pump end moves upwardly the line of contact shifts toward the power end of the beam.

Since the fulcrum of the beam shifts, without relative sliding between the bearing members, there is a shortening of one of the lever arms of the beam and a lengthening of the other lever arm. If the sole 3 points toward the pump rod end A of the lever B, the power arm is increased as the pump end goes down, hence when power is applied to the beam to pull up the pump rod, the power is applied through greater leverage to start the load.

A further advantage of my trunnionless beam is that, instead of the pump rod end A sweeping in an arc D concentric to a fixed axis, the rocker sole 3 takes a rolling action on the plate and the beam end A moves in a much flattened curtate cycloid path E (Fig. 6) about the floating fulcrum sole 3.

This straightening of the beam sweep is especially helpful during the lower half of both up and down strokes, in which the polish rod of the beam is less extended from its stuffing box and, consequently, has not the give or flexibility it has when in the upper half of its up and down strokes.

From the foregoing, it will be readily seen that, while I have gained by the elimination of rotation friction, as of a fixed trunnion, I also gain in the several respects above set out.

It will be readily comprehended from the foregoing that the beam has a fair degree of free floating movement on the support which allows it to accommodate itself to strains and stresses without twisting as occurs in rock-shaft bearings, thus avoiding the friction in bearings.

As the power arm swings down, the length of said arm is not materially shortened as it would be if the heel were of the same flat arc as the sole 3.

The slots 15 are so proportioned that the beam B, with its attached rocker 2, may be bodily shifted endwise, relative to the support, to bring the pump end or load arm of the beam into the best working position over the line of the pump polish rod. This is done without the necessity of making any adjustment of the rocker 2 on the beam itself, since the adjustment is provided for by selective adjustment of the rocker teeth 5 along the teeth 12 of the saddle. It will be seen that the teeth 12 constitute a fixed rack, in the present instance.

In placing the beam on its support, it will be clear that, after it has been decided what position the beam is to occupy in relation to the polish rod, one of the teeth 5 and one of the recesses 41 function as a locating means, whereby to properly position the rocker in the saddle.

I claim:

1. A Samson post for deep well pumps having on its top end a plane uninterrupted top load surface, and a walking beam having a rocker portion presenting a longitudinally curved, smooth rolling tread face meeting the said surface in broad, transverse rolling-line contact; whereby to eliminate point contact of the face and the surface under load and to obtain long wear life of the meeting faces and side cheeks limiting sideplay of the rocker.

2. A Samson post for beam pumps provided with a plane top bearing plate, and a walking beam having a broad, curved faced rocker part bearing and rolling on the said plate along long lines of contact; said rocker part having transverse, medially spaced, rack teeth and said plate having upstanding, intermediately disposed teeth to loosely mesh in the rack teeth and prevent undue end shift of the beam while working.

3. A Samson post for pumps provided with a top bearing plate, and a walking beam having a broad, curved faced rocker part rolling along the bearing plate; said beam rocker part and said plate having loosely meshing teeth means to prevent creep of the beam, and said teeth means including mutual racks shiftable relatively one on the other to provide an effective change of orbits for the ends of the beam.

4. A Samson post having on its top a bearing plate presenting a smooth load area, and a walking beam having a rocker portion presenting smooth, merging heel and sole tread face rolling on transverse lines along the said plate area, the heel being sharply curved back from the sole to effect a differential action as the beam rolls from the flatter sole.

5. The combination, in a deep well pump, of a Samson post having a plane-faced top plate with upstanding side cheeks and downwardly extending flanges, means passing through the flanges to secure the plate in place on the post, a walking beam disposed above the post and having a rocker, loosely fitting between the cheeks, having a curved rolling face resting upon the top plate and a retaining pin passing from cheek to cheek and through the rocker.

6. The combination, in a deep well pump, of a Samson post having a plane-faced top plate, side cheeks extending up from the plate, means for securing the plate in position on the post, a walking beam having a rocker with a curved face rolling on the top plate, said beam being bodily adjustable to operate at different positions on the plate to regulate the line of lift on an attached polish rod, and relatively shiftable rack means to loosely retain the beam in any of its working positions.

7. A cradle for a pump walking beam, consisting of a bed part having a seat to rest upon the head of a Samson post and having upstanding side cheeks, a rocker part attachable to the bottom of a walking beam and loosely fitting between the side cheeks and having a smooth rolling face bearing on the said bed part; the mutual parts presenting longitudinally uninterrupted load zones of rolling contact, and a key pin passing through the rocker part and into the bed cheeks to prevent overthrow of the mounted beam.

8. A pump operating mechanism, means for eliminating side strain from the polish rod and for causing the walking beam end to oscillate on a variable axis, comprising a pair of bearing members, one of said members having an arcuate face in contact with the other member, one of said members provided with a recess and the other with a projection loosely engaging in said recess whereby relative slippage between said members is prevented when relative rocking between said members occurs, and a pump operating lever secured to the upper member.

9. A pump operating mechanism, means for eliminating side strain from the polish rod and for causing the walking beam end to oscillate on a variable axis, comprising a support provided with a load surface, said walking beam having a rocker portion presenting a longitudinally curved tread face meeting said load surface in transverse rolling-line contact whereby to eliminate point contact with the face and the surface under load and to obtain long wear life of the meeting faces, and side cheeks on the support and laterally projecting faces on the beam between said side cheeks to limit sideplay of the beam.

10. A pump operating mechanism, means for causing the walking beam end to oscillate on a variable axis and to obtain an increase of leverage upon the load lifting stroke of said beam operating mechanism, comprising a support, a walking beam having a curved-faced rocker part bearing and rolling on the support, said rocker part having transverse, medially spaced rack teeth and said support having upstanding intermediately disposed teeth to loosely mesh in the rack teeth and prevent undue end shift of the beam while working.

11. A pump operating mechanism, means for causing the walking beam end to oscillate on a variable axis and to obtain an increase of leverage upon the load lifting stroke of said beam operating mechanism, comprising a support, and a walking beam having a broad curved-faced rocker part rolling on the support, said beam rocker part and said support having loosely meshing teeth means to prevent creep of the beam, and said teeth means including mutual racks shiftable relatively one upon the other to provide an effective change of orbits for the ends of the beam.

12. A pump operating mechanism, comprising a support, and a walking beam having a rocker portion presenting merging heel and sole tread faces rolling on transverse lines on the support, the heel being sharply curved back from the sole to effect a differential action as the beam rolls from the flatter sole.

13. A pump operating mechanism, means for eliminating side strain from the polish rod and for causing the walking beam end to oscillate on a variable axis and to obtain an increase of leverage upon the load lifting stroke of said beam operating mechanism, comprising a support provided with upstanding side cheeks, a walking beam disposed above the support and having a rocker rolling on the support and provided with buffer faces loosely fitting between the cheeks, and retaining means extending from the cheeks into the rocker.

14. A pump operating mechanism, means for eliminating side strain from the polish rod and for causing the walking beam end to oscillate on a variable axis and to obtain an increase of leverage upon the load lifting stroke of said beam operating mechanism, comprising a pair of bearing members, one of said members provided with a curved face engaging the other member to permit of relative rocking between said members, one of said members provided with elongate apertures and the other with studs projecting into said apertures to loosely connect said members and limit rocking therebetween.

15. A pump operating mechanism, means for eliminating side strain from the polish rod and for causing the operating lever to oscillate on a variable axis, comprising a support, a lever of the first class and adapted for operating the pumping mechanism of a well having a rocker in rolling contact with said support, and cooperating means on the lever and support to prevent separation of the lever from the support.

16. A pump operating mechanism, means for eliminating side strain from the polish rod and for causing the operating lever to oscillate on a variable axis, comprising a support, a lever of the first class and adapted for operating the pumping mechanism of a well having a rocker in rolling contact with said support, and cooperating means on the lever and support to prevent overthrow of the lever when operating in its normal vertical operating plane, said means including cheeks and faces between said cheeks normally spaced from said cheeks.

17. A pump operating mechanism, means to obtain an increase of leverage upon the load lifting stroke of said pump operating mechanism and for causing the operating lever to oscillate on a variable axis, comprising a support, a lever of the first class and adapted for operating the pumping mechanism of a well rockably mounted on said support, co-operating means on the lever and support to prevent twisting of the lever out of its normal vertical operating plane, said means including cheeks and faces between said cheeks normally spaced from said cheeks, and means loosely connecting the cheeks with said faces to limit rocking movement of said lever.

18. A pump operating mechanism, means for causing the pump operating lever to oscillate on a variable axis and for eliminating side strain from the polish rod, including a pump operating lever of the first class and adapted for operating the pumping mechanism of a well adapted to be connected at its lower end with a pump rod and adapted to be connected with a power means at its power end, and a pair of bearing members, one resting on the other and supporting the lever, one of said members having a curved face in engagement with the other to provide for relative rolling between said member to thereby cause shortening of the load arm and lengthening of the power arm of the lever on the down stroke of the load arm.

19. A pump operating mechanism, means for causing the pump operating lever to oscillate on a variable axis and for eliminating side strain from the polish rod, including a pump operating lever of the first class and adapted for operating the pumping mechanism of a well adapted to be connected at its load end with a pump rod and adapted to be connected with a power means at its power end, and a pair of bearing members, one resting on the other and supporting the lever, one of said members having a curved face in engagement with the other to provide for relative rolling between said members to thereby cause shortening of the load arm and lengthening of the power arm of the lever on the down stroke of the load arm, the lengthening of the load arm tending to maintain the end of the load arm in the line of the pump rod.

Signed at Los Angeles, California, this 8th day of January, 1930.

JAMES P. RATIGAN.